Sept. 18, 1956     M. LATTMANN     2,763,856
CONTROL APPARATUS
Filed Oct. 14, 1954                                 4 Sheets-Sheet 1
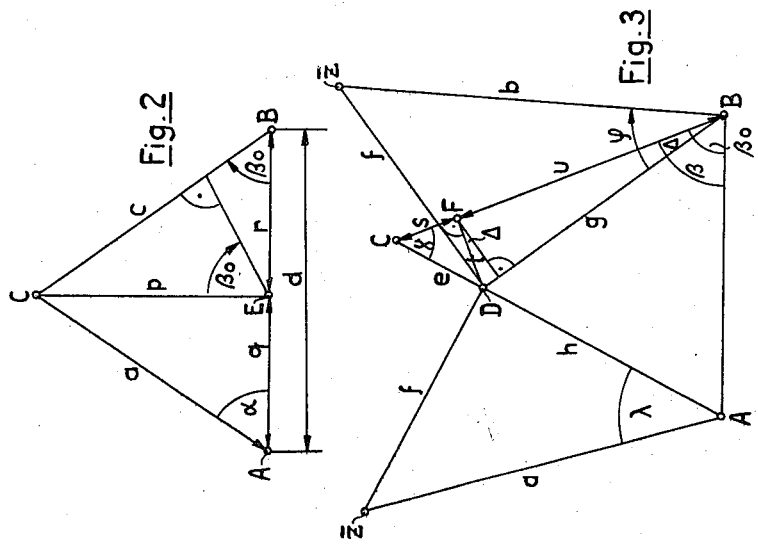
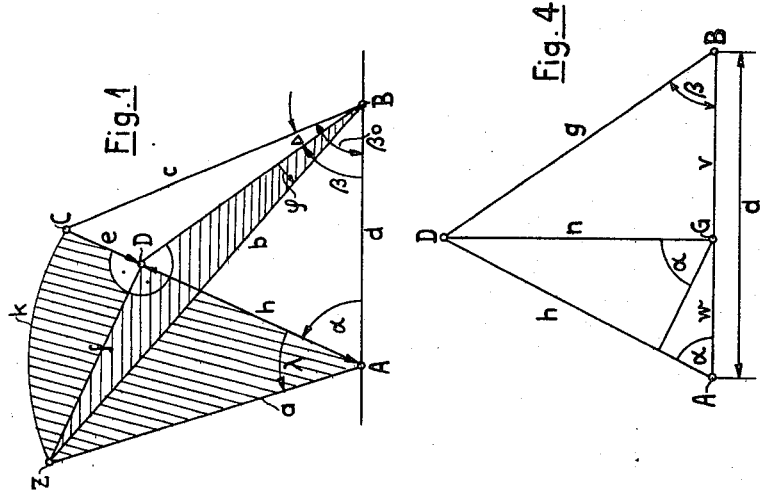
Inventor:
Max Lattmann
By: Michael S. Striker
agt

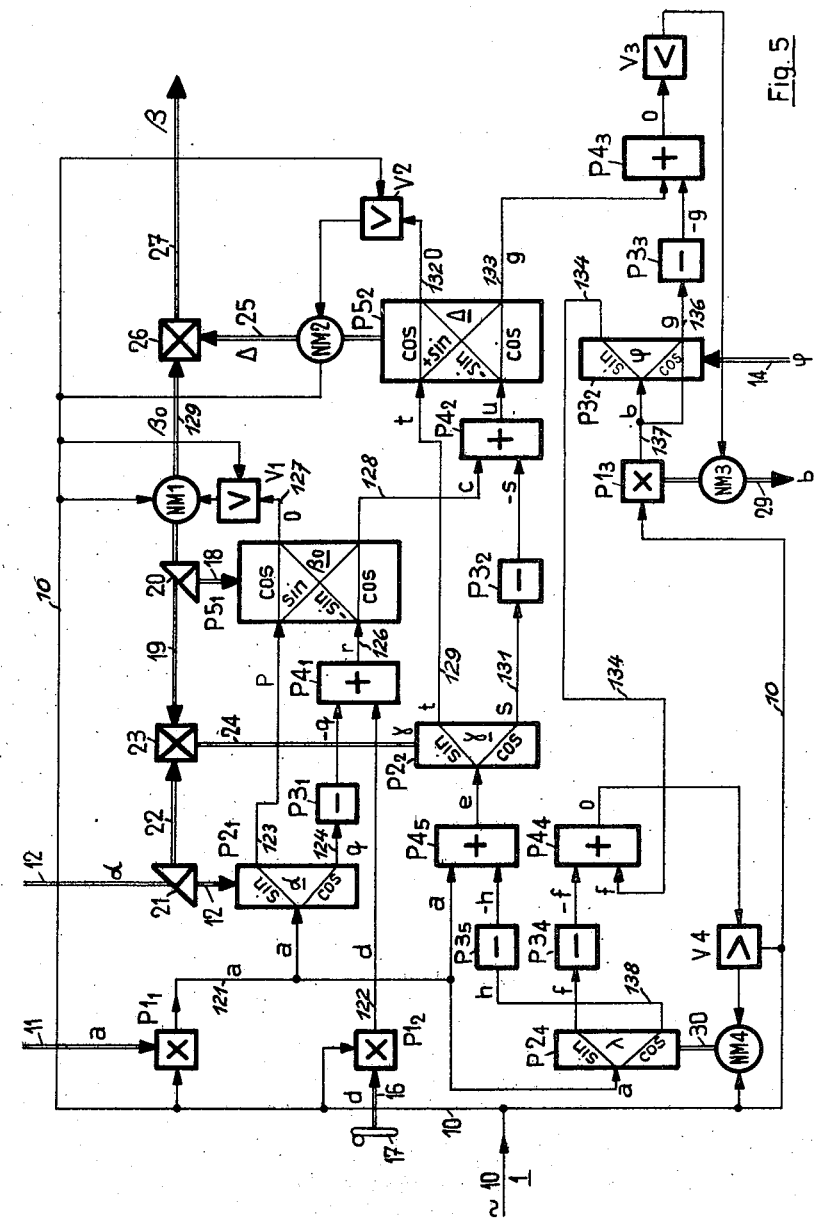

Sept. 18, 1956  M. LATTMANN  2,763,856
CONTROL APPARATUS
Filed Oct. 14, 1954  4 Sheets-Sheet 3
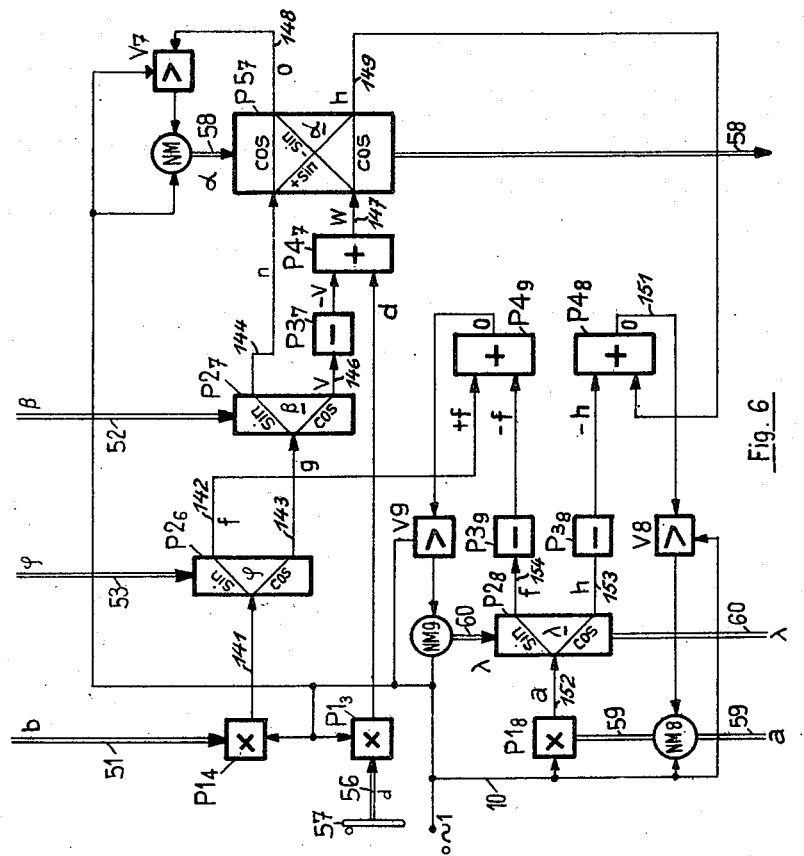

United States Patent Office 2,763,856
Patented Sept. 18, 1956

2,763,856

CONTROL APPARATUS

Max Lattmann, Zurich, Switzerland, assignor to Contraves AG, Zurich, Switzerland Application October 14, 1954, Serial No. 462,267

Claims priority, application Switzerland October 15, 1953

15 Claims. (Cl. 343—7)

The present invention relates to an apparatus for controlling one or more remote stations from a centrally located main station.

More particularly the present invention relates to an apparatus for controlling at least one remotely located gun emplacement from a main station.

For the defense of large cities and strategic areas a plurality of anti-aircraft guns are usually located over a wide area. Radar equipment is most commonly used for detecting aircraft and other flying targets. It is well known that radar equipment is relatively expensive and requires highly trained technicians for their operation. In addition once the flying targets are spotted it is necessary to aim each of the guns at the various locations. For the aiming, it is necessary to have the length of the line of sight from the gun to the target and its azimuthal and vertical angles. The length of the line of sight is important when anti-aircraft shells which are self-exploding are used.

In present day installations it is necessary to have a radar set at each of the gun emplacements to obtain information to be sent to the guns. In addition, when there are many flying targets available at one time it is almost impossible for the operators at one emplacement to know at which target to aim. It often occurs, therefore, that several guns will be trained on one of the targets while other possible targets will proceed unmolested. It is apparent that it is very difficult to relay information quickly from one gun emplacement to another to determine which of the targets the guns at the various emplacements are aimed at.

The present invention permits a commander positioned at a strategically located main station to control the operations at a plurality of gun emplacements remotely located from the main station.

It is accordingly an object of the present invention to provide a new and improved method and apparatus for controlling anti-aircraft fire at a plurality of remotely located gun emplacements.

A further object of the present invention is to provide a new and improved method and apparatus which permits an observer at a main station to select the choice of target at which any one of a plurality of gun emplacements is to be fired.

Another object of the present invention is to provide apparatus which obtains information locating a specific target with respect to a main station and automatically computes and transmits information to one or more remote stations which locates the target with respect to the particular remote station.

Another object of the present invention is to provide a computer which receives information locating a specific target with respect to a main station and transmits information to a remote station fixing the line of sight from the remote station to the target as the generatrix of a cone having the remote station at its apex and as a base a vertical circle drawn through the target about the main station.

More particularly the present invention provides an apparatus for controlling at least one gun emplacement from a main station and includes means located at the main station for spotting the target and providing a first and a second value proportional to the length of the line of sight from the main station to the target and the azimuthal angle thereof, respectively, viewing means located at the gun emplacement for viewing the spotted target, the viewing means being arranged at a predetermined distance from the main station, means for varying the vertical angle of the viewing means and for providing a third value proportional to the vertical angle, computing means, means for transmitting the first, second, and third proportional values to the computing means, the computing means being responsive to the proportional values and providing two calculated values, one of the calculated values being proportional to the length of the line of sight from the gun emplacement to a predetermined path passing through the target, the other of the calculated values being proportional to the azimuthal angle of the last mentioned line of sight, and means for automatically positioning the azimuthal angle of the viewing means as determined by the other calculated value.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic perspective view of the lines of sight from a main station to a particular target and from a remote station to the same target;

Figs. 2–4 are auxiliary schematic figures which are used to illustrate the mathematical relationship between the various coordinates utilized by the apparatus;

Fig. 5 is a block diagram of a computing mechanism used to derive the values transmitted to the remote station;

Fig. 6 is a block diagram of another computer used to obtain information from the remote station and derive quantities to be transmitted back to the main station;

Fig. 8 is a schematic diagram indicating how the values obtained at one station are transmitted to the other station.

Figure 7:
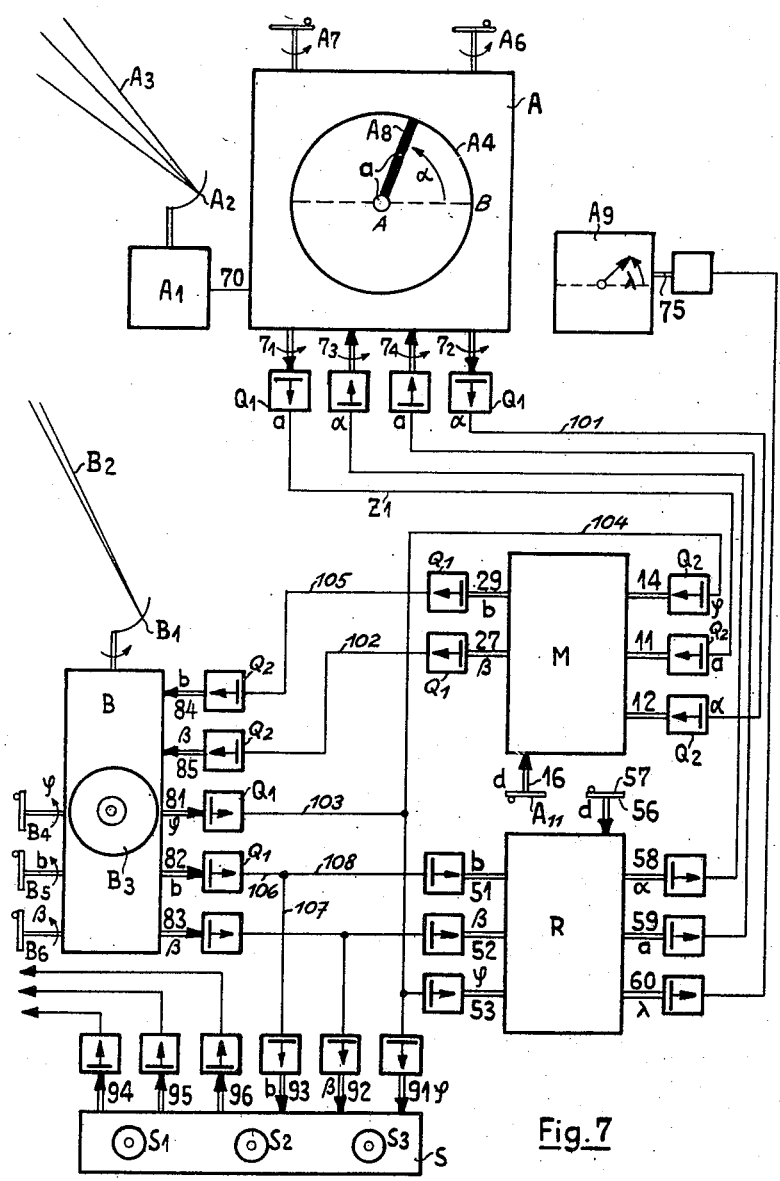
Fig. 7 is a block diagram indicating the relationships between the various parts at the main station and the remote station.

Referring now to Fig. 1, the position A represents the location of the main station. The remote station is located at B and the predetermined distance between these two stations is illustrated as $d$. The line of sight from A to Z, the moving target, is represented by $a$ and the line of sight from B to Z is represented as $b$.

The vertical projection of the target Z on the earth is represented at D and the vertical height of Z above the earth is $f$. The arc K represents a portion of the circumference of a vertical circle drawn through Z with A as the center. The intersection of the circle K with the earth is C. The vertical angle ZAD made by the line of sight $a$ from the main station is represented by $\lambda$ and the azimuthal angle BAC by $\alpha$. The vertical angle DBZ of the line of sight $b$ from the remote station is represented by $\varphi$ and its azimuthal angle ABD by $\beta$. The remaining distances and angles depicted in Fig. 1 are apparent from that figure and will be discussed hereinbelow.

Referring now to Fig. 2 in which is illustrated the triangle ABC that is in the horizontal plane, the following relationships can be obtained:

$$p = CE = a \cdot \sin \alpha \quad (1)$$
$$q = AE = a \cdot \cos \alpha \quad (2)$$
$$r = EB = d - q \quad (3)$$
$$p \cdot \cos \beta_0 - r \cdot \sin \beta_0 = 0 \quad (4)$$
$$p \cdot \sin \beta_0 + r \cdot \cos \beta_0 = C \quad (5)$$

Similarly from Figs. 1 and 3 the following equations can be obtained:

$$\gamma = ACB = 180 - (\alpha + \beta_0) \quad (6)$$
$$h = AD = a \cdot \cos \lambda \quad (7)$$
$$e = CD = a - h \quad (8)$$
$$s = CF = e \cdot \cos \gamma \quad (9)$$
$$t = DF = e \cdot \sin \gamma \quad (10)$$
$$u = BF = c - s \quad (11)$$
$$t \cdot \cos \Delta - u \cdot \sin \Delta = 0 \quad (12)$$
$$t \cdot \sin \Delta + u \cdot \cos \Delta = g = BD \quad (13)$$

In order to fix a specific target with respect to a remotely located gun emplacement from the main station it is necessary to have the vertical angle $\varphi$ and the azimuthal angle $\beta$. From Fig. 1 it is seen that the angle $\beta$ may be obtained by substracting the angle $\Delta = DBC$ from the total azimuthal angle $\beta_0 = ABC$. Accordingly from Figs. 1 and 3 the following equations are obtained:

$$f = ZD = a \cdot \sin \lambda \quad (14a)$$
$$f = ZD = b \cdot \sin \varphi \quad (14b)$$
$$a \cdot \sin \lambda - b \sin \varphi = 0 \quad (14c)$$
$$g = b \cdot \cos \varphi \quad (15)$$
$$t \cdot \sin \Delta + u \cos \Delta = b \cos \varphi \quad (16)$$
$$\beta = \beta_0 - \Delta \quad (17)$$

Referring now to Fig. 7, an overall schematic block diagram of the apparatus is shown, a radar antenna A2 is associated with a plan position indicator cathode ray tube A4. The length of the sweep line is represented by A8 and the angle of the sweep line between the main station A and the predetermined position of the remote station B is represented by $\alpha$. From the plan position indicator the length of the line of sight $a$ from the main station to a selected target Z is obtained as is the azimuthal angle $\alpha$. These quantities are obtained through well known radar techniques and adjusting dials A6 and A7 are shown in schematic form to vary the length of the sweep line and the azimuthal angle. These quantities are varied by the rotation of the shafts 71 and 72, respectively.

As illustrated in Fig. 8 it is possible to obtain an electrical voltage or current which is proportional to the angular displacement of a shaft from a reference position. In Fig. 8 an input rotatable shaft W1 is connected to the rotor of a servo transmitter Q1. As the angle between the rotor and the stator of Q1 is varied the output current in the conductor Z connected to the stator will vary a proportional amount. This current is transmitted any desired distance to the stator of a servomotor Q2 varying the field thereof. The rotor of the servomotor Q2 rotates in accordance with the change in the applied stator field. Connected to the rotor is a rotatable shaft W2. These techniques are of course conventional but are described here to show how the angular position of the shaft W1 can be duplicated by a shaft W2 located in a remote station with only an electrical conductor between the stations.

Therefore, referring again to Fig. 7 the angular displacements of the shafts 71 and 72 are transformed into proportional electrical quantities A and $\alpha$ respectively by the servo transmitters. These electrical quantities are transmitted by means of conductors Z1 and 101 respectively to respective servomotor Q2. The servomotors have output shafts 11 and 12 which are connected to the input of the computer M. The computer M has a manually adjustable dial A11 having a rotatable shaft 16 which can be displaced an angular amount representing the predetermined distance $d$ between the main station A and the remote station B.

Computer M has a third servomotor Q2 having an output shaft 14. This servomotor is connected on conductors 104 and 103 to the output of a servo transmitter Q1 having an input shaft 81. Input shaft 81 is connected to a manually adjustable shaft B4 at the remote station B. This shaft is also connected to a viewing means at the remote station. In Fig. 7 this viewing means is indicated as a second radar antenna B1 having cathode ray tube indicator B3. However, the viewing means could be the telescope of a theodolite.

For any setting of the shaft 81, its associated servo transmitter supplies an electrical quantity on conductors 103 and 104 to the servomotor of the computer M. This quantity is proportional to the vertical angle $\varphi$.

Therefore, there are three values transmitted to the computer M, each proportional respectively to the length of the line of sight $a$ from the main station to the target; the azimuthal angle $\alpha$; and the vertical angle $\varphi$. In a manner to be described hereinbelow the computer derives two quantities $b$ and $\beta$ proportional respectively to the length of the line of sight from the remote station to the target and its azimuthal angle. Since the actual vertical angle $\varphi$ has not yet been derived these quantities $b$ and $\beta$ will not necessarily be proportional to the desired line of sight. However, these derived quantities are transmitted to the remote station B to automatically position the viewing means at the remote station on a predetermined path which will pass through the chosen target as the vertical angle $\varphi$ is varied. In the embodiment to be described hereinbelow the predetermined path is the base of a cone having its apex at the remote station B and its base on a vertical circle passing through the chosen target and drawn about the main station A as its center.

At the gun emplacement B there are also provided two adjustable shafts B5 and B6 which are connected respectively to input shafts 82 and 83 of servo transmitters. The value derived from the transmitter and proportional to the length of the line of sight $b$ is applied on conductors 106 and 107 to servomotors for adjusting the firing controls on the antiaircraft guns. This quantity $b$ is also transmitted on conductor 108 to a second computer R which is used for a purpose to be later described. Similarly the value proportional to the azimuthal angle is transmitted to the firing controls and to the computer R.

The operation of the computer M will be described with respect to Fig. 5. Referring to this figure it is seen that the input shafts 11 and 12 are connected respectively to a multiplier $P1_1$ and to a bevel gear 21. The multiplier $P1_1$ is a conventional electrical multiplier having an input terminal to which a voltage is applied and having a rotatable member which may be angularly displaced an amount proportional to a desired quantity. In Fig. 5 a reference A. C. voltage is supplied on conductor 10 and applied to the multiplier $P1_1$. This reference voltage has an amplitude equal to 1. Therefore, the output of multiplier $P1_1$ taken on conductor 121 will be an A. C. voltage with an amplitude of $a$. That is, the output of the multiplier is equal to the product of the input voltage and a voltage which varies with the angular displacement of the shaft 11. Since this shaft 11 has been rotated an amount equal to the length of the line of sight $a$ the output voltage appearing on conductor 121 is an A. C. voltage having the value $a$.

Shown below the multiplier $P1_1$ is a second multiplier $P1_2$ having an input shaft 16 which may be rotated by a manually operable wheel 17. The shaft 16 is angularly displaced an amount equal to the distance $d$ between the main station A and the remote gun emplacement B. Also applied to the input of the multiplier $P1_2$ is the reference voltage on the conductor 10 so that the output voltage appearing on the conductor 122 is an A. C. voltage having a value $d$.

The voltage $a$ appearing on conductor 121 is applied to the input of a component resolver $P2_1$. As indicated in the diagram the resolver $P2_1$ has two windings, one of which varies as the sine, the other varying as the cosine. The resolver $P2_1$ is a conventional apparatus which has a rotatable shaft cooperating with its winding. For example, a goniometer may be used. As the angular displacement of the shaft varies, the output of each of the windings varies respectively as the sine and the cosine of the angle through which the shaft has been displaced.

In this case, the input shaft 12 of resolver $P2_1$ has been angularly displaced an amount equal to the azimuthal angle $\alpha$ in the manner described hereinabove. Since the voltage $a$ is also applied to the input of resolver $P2_1$, two output voltages are obtained therefrom. On conductor 123 the voltage $a \sin \alpha$ is obtained and on conductor 124 the voltage $a \cos \alpha$. From Equations 1 and 2 it can be seen that these voltage values are equal respectively to $p$ and $q$.

The voltage $p$ is directly applied to a resolver $P5_1$. However, the voltage $q$ is transmitted through a conventional phase inverter $P3_1$ where it is changed to a voltage value $-q$ and applied to a totalizer $P4_1$. This totalizer is a conventional device which has an output voltage equal to the arithmetic sum of two input voltages applied thereto. In the present case the input voltages have the values $-q$ and $d$ so that the output voltage appearing on conductor 126 has a value $d-q$ which is also applied to the resolver $P5_1$. From Equation 3 it is seen that $d-q$ is equal to the value $r$.

Therefore, the resolver $P5_1$ has two input voltages applied thereto with the values $p$ and $r$ respectively. The resolver $P5_1$ is similar to resolver $P2_1$ except that it has additional windings so that it supplies two output voltages, one being equal to the cos — sin and the other being equal to the cos + sin of the angle through which its input shaft has been displaced. The input shaft 18 of resolver $P5_1$ is rotated through a bevel gear 20 by an induction motor NM1. The motor NM1 has the reference voltage applied to it by conductor 10 and is driven by the output voltage from an amplifier V1. The amplifier V1 has two inputs one of which is the reference voltage and the other of which it receives on conductor 127 from the resolver $P5_1$.

In operation therefore the resolver $P5_1$ has two output voltages appearing on conductors 127 and 128, respectively. On conductor 127 the output voltage is equal to $p \cos x - r \sin x$ and on conductor 128 the output voltage is equal to $p \sin x + r \sin x$. The angle $x$ at the moment is an unknown angle. However, it can be seen from Equation 4 that $p \cos \beta_0 - r \sin \beta_0 = 0$. Therefore, when a voltage appears on conductor 127 it will be amplified by amplifier V1 and will rotate motor NM1 until the voltage on conductor 127 is equal to 0. At this point, the angle $x$ is obviously equal to $\beta_0$. So that $\beta_0$ becomes the angle through which shafts 18, 19 and 129 are displaced.

Accordingly, after the shaft 18 has been displaced an amount equal to $\beta_0$ the voltage output on conductor 128 becomes $p \sin \beta_0 + p \cos \beta_0$ which is equal to C (see Equation 5). This voltage is applied to a totalizer $P4_2$.

Motor NM1 also drives a shaft 19 which is angularly displaced an amount equal to the angle $\beta_0$ and is applied to one side of a totalizing gear 23. Also applied to the totalizing gear 23 is a second input shaft 22 which has been angularly displaced an amount equal to the angle $\alpha$. The totalizing gear 23 is arranged so that it rotates its output shaft 24 an amount equal to $180° - (\beta_0 + \alpha)$. From Equation 6 it is seen that this is equal to the angle $\gamma$.

Therefore the shaft 24 sets up the value $\gamma$ on a resolver $P2_2$. The input voltage applied to resolver $P2_2$ is a voltage having the value $e$ which is derived in a manner to be described hereinbelow. The output voltages of the resolver $P2_2$ are equal to $e \sin \gamma$ and $e \cos \gamma$ appearing on conductors 129 and 131, respectively. From Equations 9 and 10 it can be seen that the output voltage on conductor 129 is equal to $t$ and the output voltage on conductor 131 is equal to $s$. The voltage $t$ is applied on conductor 129 to a resolver $P5_2$. The voltage $s$ is applied on conductor 131 to a phase inverter $P3_2$ where it is changed to a voltage $-s$ and applied to the totalizer $P4_2$.

The voltage output of the totalizer $P4_2$ is equal to $c-s$ which from Equation 11 is equal to $u$. The voltage $u$ is applied to the resolver $P5_2$.

The output of the resolver $P5_2$ appears on conductors 132 and 133. The voltage on 132 equals $t \cos x - u \sin x$ and the output on conductor 133 is $t \sin x + u \cos x$. In the manner described hereinabove the output on conductor 132 is applied to an amplifier V2 which drives a second induction motor NM2 to rotate the shaft 25 of the resolver $P5_2$. When the voltage on conductor 132 equals 0 the motor NM2 will stop rotating and the shaft 25 will be displaced through an angle $\Delta$ (see Equation 12).

The shaft 25 is applied to a totalizing gear 26 which also has an input shaft 129. The input shaft 129 has been displaced on angle $\beta_0$ so that the output shaft 27 of the totalizer gear 26 is displaced through an angle equal to $\beta_0 - \Delta$ which from Equation 17 can be seen to be equal to $\beta$. Therefore the computer has provided an output shaft 27 which has been displaced through an angle $\beta$ equal to the azimuthal angle of the line of sight from the gun emplacement to the target.

The vertical angle $\varphi$ received from the gun emplacement on the shaft 14 (in the lower right hand corner of Fig. 5) rotates the shaft of resolver $P3_2$. The resolver $P3_2$ has two outputs appearing respectively on conductors 134 and 136. The voltage appearing on conductor 136 is inverted on the phase inverter $P3_3$ and applied to the totalizer $P4_3$. The output voltage from the totalizer $P4_3$ is amplified by an amplifier V3 and rotates a third induction motor NM3. The motor NM3 rotates the shaft 29 of a multiplier $P1_3$ to which is applied the reference voltage on the conductor 10. The output voltage from multiplier $P1_3$ is applied on conductor 137 to the input of the resolver $P3_2$.

When the output voltage from the amplifier V3 is equal to 0, the motor NM3 will come to a rest. The amplified voltage from V3 will be equal to 0 when the output of the totalizer $P4_3$ is equal to 0. Since one of the inputs to the totalizer $P4_3$ is equal to $g$, the output of totalizer $P4_3$ will be equal to 0 only when the other of the input voltages is equal to $-g$. It can be seen from Equation 15 that $g = b \cos \varphi$. Therefore when the motor NM3 comes to a rest the output of the multiplier $P1_3$ will be equal to $b$.

This value $b$ will not necessarily be the actual value $b$ which is the length of the line of sight from the gun emplacement to the target. This value $b$ is predicated on whatever angle $\varphi$ has been set up in the resolver $P3_2$. However this length $b$ will be equal to the length of an element of a cone having the position of the gun emplacement as its apex and as its base, a vertical circle drawn through the spotted target with the main station at its center. This follows from the equations from which the various values were derived.

Also, the output appearing on conductor 134 from resolver $P3_2$ will be $b \sin \varphi$ which is equal to $f$ (see Equation 14b). This voltage is applied to a totalizer $P4_4$ the output of which is amplified by an amplifier V4 and rotates a fourth induction motor NM4. This motor rotates a shaft 30 of resolver $P2_4$, to the input of which is applied a voltage $a$. From Equation 14a it is seen that $a \sin \lambda = f$. Therefore when the output of totalizer $P4_4$ is equal to 0 and the motor NM4 stops rotating, the shaft 30 will be displaced an amount equal to the angle $\lambda$. The other output from the resolver $P2_4$ taken on conductor 138 is equal to $a \cos \lambda$ which equals $h$ (see Equation 7). This voltage is inverted in phase inverter $P3_5$ and applied to a totalizer $P4_5$. Also applied to this totalizer is a voltage $a$ so that the output of totalizer $P4_5$ is $a-h$ which is equal to $e$ (see Equation 8).

Therefore it is seen that an azimuthal angle $\beta$ is obtained on the output shaft 27 of the computer M and the length of the line of sight $b$ is obtained on the output shaft 29 for a given vertical angle $\varphi$. The angular displacements of these shafts are converted into voltages and transmitted to the remote station B as indicated hereinabove. The result is to automatically position the azimuthal angle of the viewing means at the station B so that the line of sight $b$ is a generatrix of a cone having the station B at its apex and a vertical circle passing through the target Z drawn about the main station A at its base. Accordingly as the vertical angle of the viewing means is varied, the azimuthal angle is automatically varied until the proper vertical angle is reached and the target is sighted.

Once the target has been sighted from the remote station B, if a theodolite is used, the viewing means can be kept on the moving target by operation of the three wheels B4, B5 and B6. If a radar apparatus is used at station B once the target is spotted it will automatically be tracked without the use of the wheels B5 and B6.

When the remote station B has been placed on the desired target, the commander at the main station A may desire at any time to see whether the guns at the remote station B are still following the proper target. For this purpose a second computer R is provided. The operation of this computer will be described with respect to Fig. 6.

Referring first however to Fig. 4, the triangle ABD is shown and the following equations can be derived:

$$v = GB = g \cdot \cos \beta \qquad (18)$$
$$n = GD = g \cdot \sin \beta \qquad (19)$$
$$w = AG = d - v \qquad (20)$$
$$n \cdot \cos \alpha - w \cdot \sin \alpha = 0 \qquad (21)$$
$$n \cdot \sin \alpha + w \cdot \alpha = h \qquad (22)$$

Referring to Fig. 6 it is seen that four values are supplied to the computer R. The distance $d$ is adjusted on the shaft 56 by the manually operated wheel 57 and represents the predetermined distance between the remote station B and the main station A. The length of the line of sight $b$ from station B to the target is obtained from the shaft 51 which is applied to the input of a multiplier P1$_4$. The vertical angle $\varphi$ from the station B to the target is applied on the input shaft 52. The azimuthal angle $\beta$ from the gun emplacement B to the target is applied on the input shaft 53.

As before, a reference voltage is applied on a conductor 10 to the multipliers P1$_3$ and P1$_4$. The output of the multiplier P1$_4$ appearing on conductor 141 is equal to $b$ and applied to the resolver P2$_6$. The output conductor 142 of this resolver has a voltage $b \sin \varphi$ which is equal to $f$ (see Equation 14$b$) and is applied to a totalizer P4$_9$.

The other output voltage from the resolver P2$_6$ appears on conductor 143 and is equal to $b \cos \varphi$ which from Equation 15 is equal to $g$. This last voltage is applied to a resolver P2$_7$ which has one output voltage appearing on conductor 144 which is equal to $g \sin \beta$ which in turn is equal to $n$ (see Equation 19). The other output voltage from resolver P2$_7$ appears on conductor 146 and is equal to $g \cos \beta$ which in turn is equal to $v$ (see Equation 18). This last voltage is inverted in a phase inverter P3$_7$ and applied to a totalizer P4$_7$. The other input to this totalizer is the voltage $d$ so that the totalizer has an output voltage appearing on conductor 147 equal to $d-v$ which in turn is equal to $w$ (see Equation 20). The voltage $w$ is also applied to the input of resolver P5$_7$.

One of the output voltages of the resolver P5$_7$ is applied on conductor 148 to an amplifier V7 and used to energize a motor NM. When the output voltage appearing on conductor 148 is equal to 0, the motor NM will stop rotating and will have displaced the shaft 58 through an angle $\alpha$. At this point the output voltage from the resolver P5$_7$ appearing on conductor 149 will be equal to $n \sin \alpha + w \cos \alpha$ which in turn is equal to $h$ (see Equation 22). This voltage is applied to a totalizer P4$_8$. At the same time the azimuthal angle $\alpha$ of the line of sight from the main station A to the target is applied on the output shaft 58.

To obtain the remaining values the output of a totalizer P4$_8$ is applied on conductor 151 to an amplifier V8 which drives a motor NM8. This motor rotates a shaft 59 of a multiplier P1$_8$ whose output is applied on a conductor 152 to a resolver P2$_8$. One of the outputs of the resolver P2$_8$ is applied on conductor 153 through a phase inverter P3$_8$ to a totalizer P4$_8$.

The other output is applied on conductor 154 through a phase inverter P3$_9$ to a totalizer P4$_9$. The output of the totalizer P4$_9$ is amplified in amplifier V9 and is used to energize the motor NM9. The motor NM9 rotates the shaft 60 of the resolver P2$_8$. Both motors will be deenergized when the outputs of the totalizers P4$_8$ and P4$_9$ are each equal to 0. This will occur when the voltage on conductor 154 is equal to $f$ and the voltage on conductor 153 is equal to $h$. At this point resolver P2$_8$ will have its shaft 60 displaced an amount equal to the angle $\lambda$ and the multiplier P1$_8$ will have its shaft 59 displaced an amount equal to $a$.

The values on these output shafts are used to set up equivalent values in the main station A as discussed hereinabove with respect to Fig. 7. The vertical angle $\lambda$ is displayed on a second cathode ray tube A9 at the main station and the PPI cathode ray tube A4 displays a length $a$ and an angle $\alpha$ derived from the remote gun emplacement B. The commander at the main station may then see whether the remote station is aimed at the desired target.

In operation therefore, the commander at the main station chooses a target Z. The information concerning this target is transmitted to the computer M associated with the particular remote gun emplacement strategically located for firing at this target. The operator at the remote gun emplacement varies his viewing means from 0° to 90°. For each value of the vertical angle through which the viewing means is varied a corresponding angular displacement is made on the shaft 81. This information is transmitted to the computer which derives an azimuthal angle $\beta$ and a value $b$ corresponding to the length of the line of sight from the remote station to the chosen target.

The calculated value $\beta$ is transmitted back to the remote station and automatically positions the azimuthal angle of the viewing means. At all times the calculated values will provide an azimuthal angle $\beta$ and a length $b$ which will cause the line of sight from the remote station to be a generatrix of a cone having its apex at the remote station B and its base corresponding to a vertical circle drawn through the target about the main station.

Therefore, the vertical angle of the viewing means is varied until the target is sighted. Since the azimuthal angle is automatically positioned, the viewing means must intersect the target. When the target is sighted the proper angle $\varphi$ is determined and the calculated values from the computer are the correct values for the sighted target.

The operators at the remote station now transmit this information to the fire control means at the guns located at the main station. If the commander at the main station desires to know whether the remote gun emplacement is sighted on the desired target, the information derived at the remote station is transmitted to the computer R which derives the reverse values for the main station. The commander then compares the values obtained at the main station to the values derived from the remote station and he has all the desired information.

The present apparatus has been described only with respect to a predetermined path which is a vertical circle drawn through the target having the main station A at its center. It is apparent however that other predetermined paths may be chosen and appropriate equations derived therefrom.

It will be understood that each of the elements described above, or two or more together, may also find a useful application in other types of control apparatus differing from the types described above.

While the invention has been illustrated and described as embodied in control apparatus for controlling at least one gun emplacement from a main station, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for controlling at least one gun emplacement from a main station, comprising, in combination, means located at said main station for spotting a target and providing a first and a second electrical signal proportional to the length of the line of sight from said main station to the target and the azimuthal angle thereof, respectively; viewing means located at said gun emplacement for viewing the spotted target, said viewing means being arranged at a predetermined distance from said main station; means for varying the vertical angle of said viewing means and for obtaining a third electrical signal proportional to the vertical angle of said viewing means; computing means adjusted for said predetermined distance; means for transmitting said first, second and third proportional electrical signals to said computing means, said computing means being responsive to said first, second and third proportional electrical signals and providing at least two calculated electrical signals one being proportional to the length of the line of sight from said gun emplacement to a vertical circle drawn through the spotted target with the main station as a center and the other being proportional to the azimuthal angle thereof; and means for automatically positioning the azimuthal angle of said viewing means in accordance with said other calculated electrical signal.

2. Apparatus for controlling at least one gun emplacement from a main station, comprising, in combination, means located at said main station for spotting a target and providing a first and a second electrical signal proportional to the length of the line of sight from said main station to the target and the azimuthal angle thereof, respectively; viewing means located at said gun emplacement for viewing the spotted target, said viewing means being arranged at a predetermined distance from said main station; means for varying the vertical angle of said viewing means and for obtaining a third electrical signal proportional to the vertical angle of said viewing means; computing means adjusted for said predetermined distance; means for transmitting said first, second and third electrical signals to said computing means, said computing means being responsive to said three electrical signals and providing at least two calculated electrical signals, one being proportional to the length of the line of sight from said gun emplacement to a vertical circle drawn through the spotted target with the main station as a center and the other being proportional to the azimuthal angle thereof; and means for automatically positioning the azimuthal angle of said viewing means in accordance with said other calculated electrical signal.

3. Apparatus for controlling at least one gun emplacement from a main station, comprising, in combination, means located at said main station for spotting a target and providing a first and a second electrical signal proportional to the length of the line of sight from said main station to the target and the azimuthal angle thereof, respectively; viewing means located at said gun emplacement for viewing the spotted target, said viewing means being arranged at a predetermined distance from said main station; means for varying the vertical angle of said viewing means and for obtaining a third electrical signal proportional to the vertical angle of said viewing means; computing means adjusted for said predetermined distance; means for transmitting said first, second and third proportional electrical signals to said computing means, said computing means being responsive to said first, second third proportional electrical signals and providing at least two calculated electrical signals, one being proportional to the length of the line of sight from said gun emplacement to a vertical circle drawn through the spotted target with the main station as a center and the other being proportional to the azimuthal angle thereof; means for automatically positioning the azimuthal angle of said viewing means in accordance with said other calculated electrical signal, said viewing means being varied until said target is sighted whereby the calculated electrical signal of the azimuthal angle equals the actual azimuthal angle of the line of sight from said gun emplacement to said target; means for providing three further electrical signals proportional respectively to the length of the line of sight from said gun emplacement to said target and the azimuthal and vertical angle thereof; and second computing means responsive to said three further proportional electrical signals and for providing three new calculated electrical signals proportional to the length of the line of sight from said main station to said target and the vertical and azimuthal angles thereof.

4. Apparatus for controlling at least one gun emplacement from a main station, comprising, in combination, means located at said main station for spotting a target and providing a first and a second electrical signal proportional to the length of the line of sight from said main station to the target and the azimuthal angle thereof, respectively; viewing means located at said gun emplacement for viewing the spotted target, said viewing means being arranged at a predetermined distance from said main station; means for varying the vertical angle of said viewing means and for obtaining a third electrical signal proportional to the vertical angle of said viewing means; computing means adjusted for said predetermined distance; means for transmitting said first, second and third proportional electrical signals to said computing means, said computing means being responsive to said first, second and third proportional electrical signals and providing at least two calculated electrical signals, one being proportional to the length of the line of sight from said gun emplacement to a vertical circle drawn through the spotted target with the main station as a center and the other being proportional to the azimuthal angle thereof; means for automatically positioning the azimuthal angle of said viewing means in accordance with said other calculated electrical signal, said viewing means being varied until said target is sighted whereby the calculated electrical signal of the azimuthal angle equals the actual azimuthal angle of the line of sight from said gun emplacement to said target; means for providing three further electrical signals proportional respectively to the length of the line of sight from said gun emplacement to said target and the azimuthal and vertical angle thereof; second computing means responsive to said three further proportional electrical signals and for providing three new calculated electrical signals proportional to the length of the line of sight from said main station to said target and the vertical and azimuthal angles thereof; means for transmitting said new calculated electrical signals to said main station; and means located at said main station responsive to said three new calculated electrical signals and indicating and comparing these electrical signals received from the remote station to the electrical signals determined at said main station.

5. Apparatus for controlling a plurality of gun emplacements from a main station, comprising, in combination, means located at said main station for spotting a target and providing a first and a second electrical signal proportional to the length of the line of sight from said main station to the target and the azimuthal angle thereof, respectively; viewing means located at each of said gun emplacements for viewing the spotted target, each of said viewing means being arranged at a predetermined distance from said main station; means for respectively varying the vertical angle of each of said viewing means and for obtaining a third electrical signal proportional to the vertical angle of said viewing means; a plurality of computing means adjusted respectively for each of said predetermined distances; means for transmitting said first, second and third proportional electrical signals to said computing means, said computing means being responsive to said first, second and third proportional electrical signals and providing at least two calculated electrical signals one being proportional to the length of the line of sight from the respective gun emplacement to a vertical circle drawn through the spotted target with the main station as a center and the other being proportional to the azimuthal angle thereof; and means for automatically positioning the azimuthal angle of each of said viewing means in accordance with said other calculated electrical signal.

6. Apparatus for controlling at least one gun emplacement from a main station, comprising, in combination, means located at said main station for spotting a target and providing a first and a second electrical signal proportional to the length of the line of sight from said main station to the target and the azimuthal angle thereof, respectively; viewing means located at said gun emplacement for viewing the spotted target, said viewing means being arranged at a predetermined distance from said main station; means for varying the vertical angle of said viewing means and for obtaining a third electrical signal proportional to the vertical angle of said viewing means; computing means adjusted for said predetermined distance; means for transmitting said first, second and third proportional electrical signals to said computing means, said computing means being responsive to said first, second and third proportional electrical signals and providing at least two calculated electrical signals for positioning the line of sight from said gun emplacement along the surface of a cone having the position of the gun emplacement as its apex and as its base, a vertical circle drawn through the spotted target with said main station as the center; and means for automatically positioning the azimuthal angle of said viewing means in accordance with said calculated electrical signals.

7. Apparatus for controlling at least one gun emplacement from a main station, comprising, in combination, radar means located at said main station for spotting a target and providing a first and a second electrical signal proportional to the length of the line of sight from said main station to the target and the azimuthal angle thereof, respectively; viewing means located at said gun emplacement for viewing the spotted target, said viewing means being arranged at a predetermined distance from said main station; means for varying the vertical angle of said viewing means and for obtaining a third electrical signal proportional to and vertical angle of said viewing means; computing means adjusted for said predetermined distance; means for transmitting said first, second and third proportional electrical signals to said computing means, said computing means being responsive to said first, second and third proportional electrical signals and providing at least two calculated electrical signals, one being proportional to the length of the line of sight from said gun emplacement to a vertical circle drawn through the spotted target with the main station as a center and the other being proportional to the azimuthal angle thereof; and means for automatically positioning the azimuthal angle of said viewing means in accordance with said other calculated electrical signal.

8. Apparatus for controlling at least one gun emplacement from a main station, comprising, in combination, radar means located at said main station for spotting a target and providing a first and a second electrical voltage proportional to the length of the line of sight from said main station to the target and the azimuthal angle thereof, respectively; a theodolite located at said gun emplacement for viewing the spotted target, said theodolite being arranged at a predetermined distance from said main station; means for varying the vertical angle of said theodolite and for obtaining a third electrical voltage proportional to the vertical angle of said viewing means; computing means adjusted for said predetermined distance; means for transmitting said first, second and third electrical voltages to said computing means, said computing means being responsive to said electrical voltages and providing at least two calculated electrical signals, one being proportional to the length of the line of sight from said gun emplacement to a vertical circle drawn through the spotted target with the main station as a center and the other being proportional to the azimuthal angle thereof; and means for automatically positioning the azimuthal angle of said theodolite in accordance with said other calculated electrical signal.

9. Apparatus for controlling at least one gun emplacement from a main station, comprising, in combination, radar means located at said main station for spotting a target and providing a first and a second electrical signal proportional to the length of the line of sight from said main station to the target and the azimuthal angle thereof, respectively; radar means located at said gun emplacement for viewing the spotted target, said viewing means being arranged at a predetermined distance from said main station; means for varying the vertical angle of said viewing means and for obtaining a third electrical signal proportional to the vertical angle of said viewing means; computing means adjusted for said predetermined distance; means for transmitting said first, second and third proportional electrical signals to said computing means, said computing means being responsive to said first, second and third proportional electrical signals and providing at least two calculated electrical signals, one being proportional to the length of the line of sight from said gun emplacement to a vertical circle drawn through the spotted target with the main station as a center and the other being proportional to the azimuthal angle thereof; and means for automatically positioning the azimuthal angle of said viewing means in accordance with said other calculated electrical signal until said target is sighted by said viewing means whereby said radar viewing means at said gun emplacement automatically varies the length of the line of sight from said gun emplacement to said target and the azimuthal angle thereof to track the spotted target.

10. Apparatus for controlling at least one gun emplacement from a main station, comprising, in combination, means located at said main station for spotting a target and providing a first and a second electrical signal proportional to the length of the line of sight from said main station to the target and the azimuthal angle thereof, respectively; viewing means located at said gun emplacement for viewing the spotted target, said viewing means being arranged at a predetermined distance from said main station; means for varying the vertical angle of said viewing means and for obtaining a third electrical signal proportional to the vertical angle of said viewing means; computing means adjusted for said predetermined distance; means for transmitting said first, second and third proportional electrical signals to said computing means, said computing means being responsive to said first, second and third proportional electrical signals and providing at least two calculated electrical signals, one being proportional to the length of the line of sight from said gun emplacement to a vertical circle drawn through the spotted target with the main station as a center and the other being proportional to the azimuthal angle thereof; means for automatically positioning the azimuthal angle of said viewing means in accordance with said other calculated electrical signal; and means associated with said viewing means and responsive to said third proportional electrical signal and said two calculated electrical signals for aiming the guns in said gun emplacement.

11. Apparatus for controlling at least one gun emplacement from a main station, comprising, in combination, a transmitting-receiving radar antenna and a plan position indicator located at said main station for spotting a target and providing a first and a second electrical signal proportional to the length of the line of sight from said main station to the target and the azimuthal angle thereof, respectively; radar means located at said gun emplacement for viewing the spotted target, said viewing means being arranged at a predetermined distance from said main station; means for varying the vertical angle of said viewing means and for obtaining a third electrical signal proportional to the vertical angle of said viewing means; computing means adjusted for said predetermined distance; means for transmitting said first, second and third proportional electrical signals to said computing means, said computing means being responsive to said first, second and third proportional electrical signals and providing at least two calculated electrical signals, one being proportional to the length of the line of sight from said gun emplacement to a vertical circle drawn through the spotted target with the main station as a center and the other being proporional to the azimuthal angle thereof; and means for automatically positioning the azimuthal angle of said viewing means in accordance with said other calculated electrical signal.

12. Apparatus for controlling at least one gun emplacement from a main station, comprising, in combination, means located at said main station for spotting a target and providing a first and a second angular shaft displacement proportional to the length of the line of sight from said main station to the target and the azimuthal angle thereof, respectively; viewing means located at said gun emplacement for viewing the spotted target, said viewing means being arranged at a predetermined distance from said main station; means for varying the vertical angle of said viewing means and for obtaining a third angular shaft displacement proportional to the vertical angle of said viewing means; computing means adjusted for said predetermined distance; a plurality of servo-transmitters for respectively converting each of said angular shaft displacements into a proportional electrical voltage; a plurality of servo-motors located at said computor; means for transmitting the proportional electrical voltages to said servo-motors, said computing means being responsive to said servo-motors to provide at least two calculated electrical signals, one being porportional to the length of the line of sight from said gun emplacement to a vertical circle drawn through the spotted target with the main station as a center and the other being proportional to the azimuthal angle hereof; and means for automatically positioning the azimuthal angle of said viewing means in accordance with said other calculated electrical signal.

13. A computer for use with apparatus controlling at least one remote gun emplacement from a main station, comprising, in combination, multiplier means responsive to the length of the line of sight from said main station to a target; resolver means responsive to the azimuthal angle of the line of sight from said main station to the target; second resolver means responsive to the actual vertical angle of the line of sight of the viewing means at the gun emplacement; and means for combining the outputs of said multiplier means and said first and second resolver means to provide calculated electrical signals for the length of the line of sight from the gun emplacement to the target and the azimuthal angle thereof for any actual vertical angle of said line of sight, said calculated electrical signals being determined by positioning said line of sight as the generatrix of a cone having as its apex the position of the gun emplacement and as its base a vertical circle drawn about the main station through the target.

14. Apparatus for controlling at least one gun emplacement from a main station, comprising, in combination, means located at said main station for spotting a target and providing a first and a second electrical signal proportional to the length of the line of sight from said main station to the target and the azimuthal angle thereof, respectively; viewing means located at said gun emplacement for viewing the spotted target, said viewing means being arranged at a predetermined distance from said main station; means for varying the vertical angle of said viewing means and for obtaining a third electrical signal proportional to the vertical angle of said viewing means; computing means adjusted for said predetermined distance; means for transmitting said first, second and third proportional electrical signals to said computing means, said computing means being responsive to said first, second and third proportional electrical signals and providing at least two calculated electrical signals one being proportional to the length of the line of sight from said gun emplacement to a predetermined path drawn through the spotted target and the other being proportional to the azimuthal angle thereof; and means for automatically positioning the azimuthal angle of said viewing means in accordance with said other calculated electrical signal.

15. A computer for use with apparatus controlling at least one remote gun emplacement from a main station comprising, in combination, multiplier means responsive to the length of the line of sight from said main station to a target; resolver means responsive to the azimuthal angle of the line of sight from said main station to the target; second resolver means responsive to the actual vertical angle of the line of sight of the viewing means at the gun emplacement; and means for combining the outputs of said multiplier means and said first and second resolver means to provide calculated electrical signals for the length of the line of sight from the gun emplacement to the target and the azimuthal angle thereof for any actual vertical angle of said line of sight, said calculated electrical signals being determined by aiming said line of sight at a predetermined path passing through the target.

References Cited in the file of this patent

UNITED STATES PATENTS

| | | |
|---|---|---|
| 2,419,239 | White | Apr. 22, 1947 |
| 2,513,279 | Bradley | July 4, 1950 |